United States Patent Office 3,268,211
Patented August 23, 1966

3,268,211
CONTROL SYSTEM FOR WINCHES AND THE LIKE
Alfred Schlechter and Hanns Trübenbach, Essen-Heisingen, Kettwig (Ruhr), Germany, assignors to Emil Wolff Maschinenfabrik und Eisengiesserei G.m.b.H., Essen, Germany, a corporation of Germany
Filed Oct. 22, 1965, Ser. No. 502,674
7 Claims. (Cl. 254—185)

The present invention relates to a control system for winches and, more particularly, for drag-line winches of the type described in the commonly assigned copending application Ser. No. 380,859, filed July 7, 1964.

In the aforementioned copending application, there are described improvements in so-called drag-line winches of the type commonly in use for earth-moving in, for example, the mining industry. In such systems, a bucket or the like is pulled along the ground surface by a winch driven by a source of motive power (e.g. an engine or electric motor). The winch is frequently subjected to start-stop operations and to variations in the torque to be applied to the takeup drums. To avoid snapping of the control cable and to regulate the speed of the bucket, therefore, it is necessary that means be provided in such winches to enable them to operate, at least under certain conditions, with slip between driving and driven elements. It has been pointed out in this application that prior planetary-gear winch systems were incapable of withstanding the substantial strains placed upon the clutch devices and were characterized by poor heat dissipation and, therefore, early deterioration of the clutch structures.

When, however, planetary-gear-type winches are replaced by winch systems of the type described in the copending application, these disadvantages are no longer in evidence. The improved winch generally comprises at least one cable reel journaled coaxially with a drive shaft which, in turn, is coupled with a source of motive power (such as an internal-combustion or steam engine, an electric motor or the like) and an automative-type (e.g. internal-expanding or disk) brake having a fluid-operated control system for coupling the driving shaft with the cable reel for start-stop and controlled-slip operation. In general, the clutch mechanism, which resembles an automotive brake, includes a first coupling unit (e.g. a brake drum) on an extremity of the continuously driven shaft and a co-operating second coupling unit (e.g. a pair of arcuate brake shoes) on a carrier member in the form of a hollow or dished disk which is rigid with the cable reel and extends generally transversely beyond the shaft extremity so as to permit attachment of a supply line for the hydraulic fluid.

It has been found, moreover, that the use of conventional winch-control systems with the improved winch structure has led to difficulties related to the complexity of the prior control systems as well as problems in accommodating them to the clutch mechanism used in the improved winches. For example, it was the practice to provide a control system for planetary-gear-type winches which included a brake adapted to immobilize one or more elements of the gear system and a clutch enabling slippage or regulation of the system. For the most part, the brake devices were operated by counterweight-loaded single-action pistons whereas the clutch was provided with a double-acting piston, both pistons being reciprocable in respective cylinders under the control of hydraulic fluid from complex three-way distributing valves. The latter are generally electrically operated and complex hydraulic control must be provided to ensure that the brake is released upon energization of the clutch. Similar systems have not been satisfactorily employed heretofore with winch arrangements using automotive-type brakes as the clutch element between the cable reel and the drive shaft.

It is, therefore, an important object of the present invention to provide an improved control system for a dragline winch of the type described and claimed in copending application Ser. No. 380,859.

A further object of this invention is to provide a hydraulic-control system for a winch of this character which will enable full or partial coupling of the cable reel with the shaft with a minimum of difficulty and without undesirable complexities and disadvantages now characterizing the control system of planetary-gear-type winches.

Still another object of the invention is to provide a control system for a winch arrangement utilizing automotive-type hydraulically operating brake system as clutch mechanism which will permit accurate control of the hydraulic devices and thus of the clutching operation.

These objects and others which will become readily apparent hereinafter are attained, in accordance with the present invention, by providing a hydraulic control system for a dragline winch having a source of motor power such as an engine or electric motor, a shaft coupled with this source and driven thereby, at least one cable reel journaled for rotation about the axis of this shaft, and an automotive-type, preferably internal-expanding brake for interconnecting the shaft and the reel for joint or relative angular displacement, the control system co-operating with the hydraulic-cylinder arrangement of the clutch mechanism so as to constitute this cylinder as a servo motor positionable in accordance with a master hydraulic control means. According to this invention, the master hydraulic control means is remote from the hydraulic motor of the clutch mechanism and comprises a hydraulically operable and selectively positionable transmitter element, a follower or receiver element hydraulically coupled with the hydraulic motor of the clutch mechanism for shifting same, and resilient means interconnecting the transmitting and follower element.

According to a more specific feature of this invention, the selectively positionable transmitting element is constituted by a piston-and-cylinder arrangement of the double-acting type to which fluid under pressure can be supplied to shift the piston in one direction or the other by a distance proportional to the duration of energization of a two-mode electromagnetically operable valve. The resilient means can thus be constituted as a compression spring seated against the piston of the transmitting element so that it is selectively loadable thereby. The follower element, according to this invention, is constituted by an assembly resembling an automotive-brake master cylinder whose piston is designed to displace the hydraulic fluid into the hydraulic motor of the clutch mechanism and which piston is shifted by the force of the compression spring. Thus, the master cylinder of the system defines between its piston and the selectively positionable piston of the hydraulic motor of the clutch mechanism a relatively "static" pressure-transmitting column of hydraulic fluid whereas the hydraulic transmitter is operated by a dynamic fluid circuit through the electromagnetically operable valve. The term "dynamic" is used herein to denote a hydraulic circuit in constant movement regardless of the state of the control valve in systems energized thereby. Such a circuit includes one or more pumps, reservoirs and fluid-directing valves. The electromagnetically operable valve, in turn, may be connected to suitable switch means for selecting the valve mode.

It will be seen that the system of the present invention permits an accurate control of the position of the hydraulic piston of the clutch mechanism and that this precise method of control is possible without complex distributing-valve arrangements as hitherto required. Moreover, the master-cylinder arrangement in the hydraulic control means and the mechanism for operating the master piston are themselves relatively simple and can be produced at little cost.

The above and other objects, features and advantages of the present invention will become more readily apparent from the following description, reference being made to the accompanying drawing in which.

Figure 1:
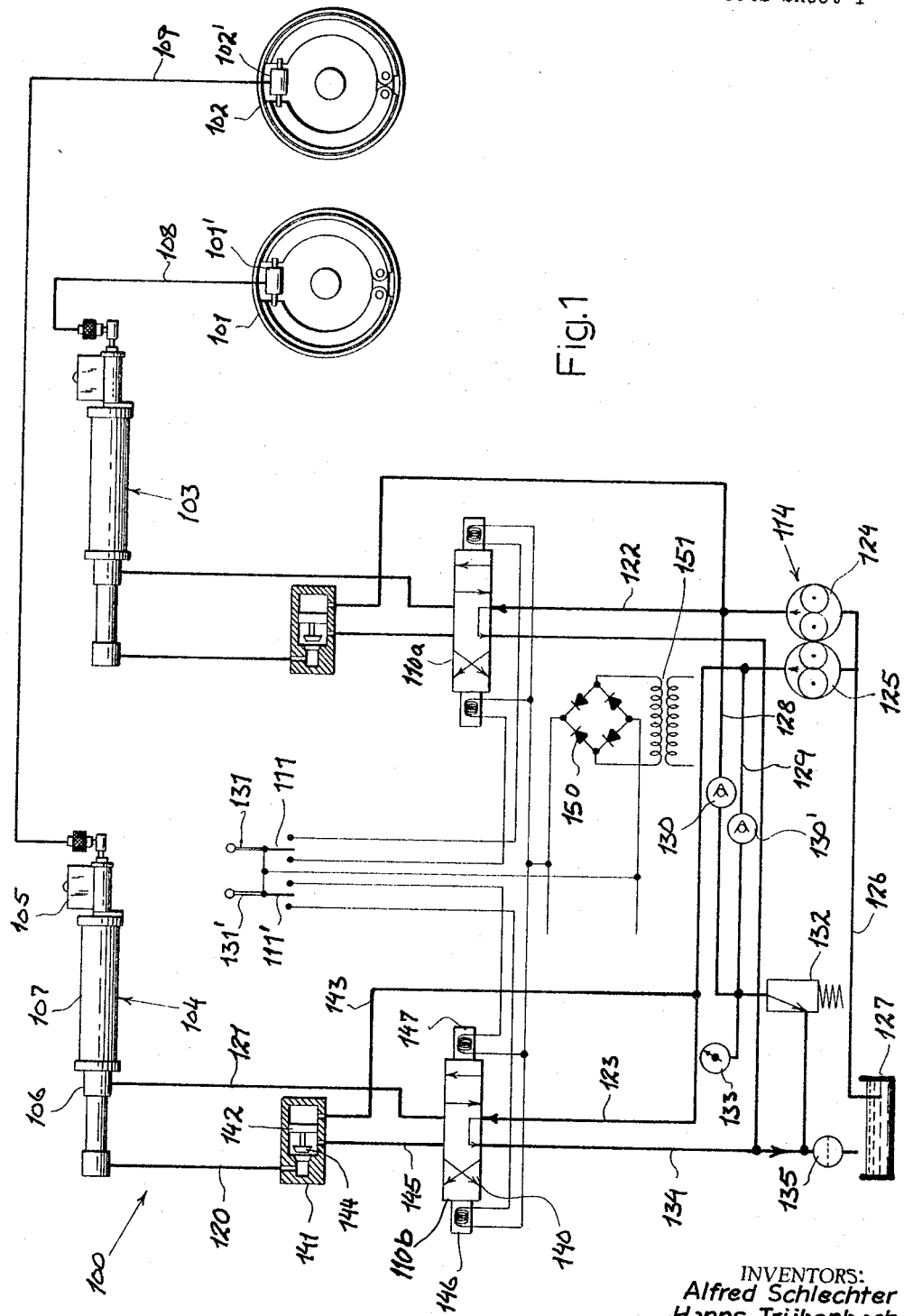
FIG. 1 is a schematic diagram of the hydraulic control system of the present invention with the fluid ducts indicated in relatively light lines.

Prior to describing the control system of the instant invention, the drag-line winch assembly with which it is to be used, will be described with reference to FIGS. 3 and 4. It is to be understood that this assembly is of the type described in the aforementioned copending application which contains a more complete description of the functioning and mode of operation of the several parts. The drag-line winch illustrated in FIGS. 3 and 4 comprises a frame 1 having bearings 27, 27' in which is journaled an elongated shaft 2. Mounted on the shaft 2 at its center, by means of a keyway 3 and a key (not shown) is a worm gear 4 adapted to rotate with the shaft. The worm gear 4, and through it the shaft 2, is powered by a suitable motive source, shown as an electric motor 5 and a step-down transmission 6 acting on the centrally positioned gear 4 through a worm below this gear not illustrated in FIGS. 3 and 4. Axially placed from gear 4 and symmetrically arranged on opposite sides thereof are two cable reels 7, 7' which are mounted on the ends of shaft 2 by way of respective pairs 8, 9 and 8', 9' of ball bearings with freedom of independent rotation. These reels and their associated equipment being identical in design and operation, the following description will be limited to reel 7, it being understood that reel 7' is a mirror image thereof.

The peripheral wall of reel 7 is stepped to an annular sleeve 10 coaxial with the shaft. To the outer edge of this sleeve is secured a transverse carrier plate 11 defining an end wall of a cup-shaped member whose peripheral wall is constituted by the sleeve 10. A pair of brake shoes 12a, 12b with linings 32a, 32b are fastened to the side of the plate 11 facing the interior of sleeve 10. For purposes of actuation the shoes 12a, 12b are operatively associated with an external hydraulic power source (FIGS. 1 and 2) via the fixed supply lines 108, 109, terminating at the center of the respective plate 11, and a rotable distributor 15 coupled to it in fluid-tight manner, the hydraulic fluid entering a piston cylinder (hydraulic motor) 16, representative of either hydraulic cylinders 101', 102', by way of feeder line 17; the axis of cylinder 16 is skew to that of shaft 2 and reels 7, 7'.

An annular brake drum 18 coaxially surrounds an extremity 20 of shaft 2 and is secured thereto for common rotation by means of a keyway 19. The cylindrical wall of drum 18 embraces the brake shoes 12a, 12b and is received within sleeve 10 with slight annular clearance. To dissipate the heat generated by the friction of the brake shoes upon their engagement with the inner surface of the peripheral wall 21, the outer surface of that wall is formed with a number of annular rigs 22 adapted to radiate heat outwardly by way of peripheral holes 23 in sleeve 10. A sheet-metal membrane 25, considerably thinner than carrier plate 11, is disposed between this plate and the open end of cylinder 21 whose periphery its crimped edge overlies with small spacing to facilitate relative rotation, thereby effectively sealing the brake mechanism against the entrance of foreign matter. Plate 11 has similar perforations 24 to promote the circulation of cooling air.

A cylindrical housing 26, rigid with frame 1, surrounds the entire brake assembly as well as the reels 7, 7' which are accessible through ports 28, 28' that enable the passage of respective lengths of cable 35 attached to these reels 30, 30' in order to be paid out as required. The housing 26 is also open, for cooling purposes, at least at its ends which are formed by spider arms 33, 33' supporting the conduits 108, 109 of a hydraulic control system 100 remote from the brake assemblies 101, 102. The closed end of drum 18 is also shown perforated, at 34, for improved circulation.

In operation, motor 5 and transmission 6 maintain the shaft 2 in continuous rotation. Whereas the independently journaled reels 7, 7' are not directly affected by this movement, brake drums 18 and 18' rotate with the shaft. If the operator wishes to reel up some of the cable on reel 7 or 7' in order to bring in the associated bucket, he operates the hydraulic control 100 by means of a respective control lever 131 or 131'. Fluid now flows through, say, line 109 into the distributor 15 and from there via the feeder line 17 into the cylinder 16. The two pistons of the latter move radially outwardly and cause the brake shoes 12a, 12b to pivot about a pin 33 on plate 11 in a sense bringing them to bear upon the inner surface of drum cylinder 21 against the force of a restoring spring 29. Since the brake shoes are positively coupled with the reel 7 via their support plate 11, a frictional connection has thus been established between the shaft 2 and the reel 7 and the latter is now entrained for synchronous or lagging rotation with the shaft, depending upon the resistance encountered by a drag bucket 36 on the far end of the length of cable 35 wound about the reel. The degree of slip of reel 7 is, of course, being controlled by varying the positions of the pistons of the brake shoes via the hydraulic control.

Figure 3:
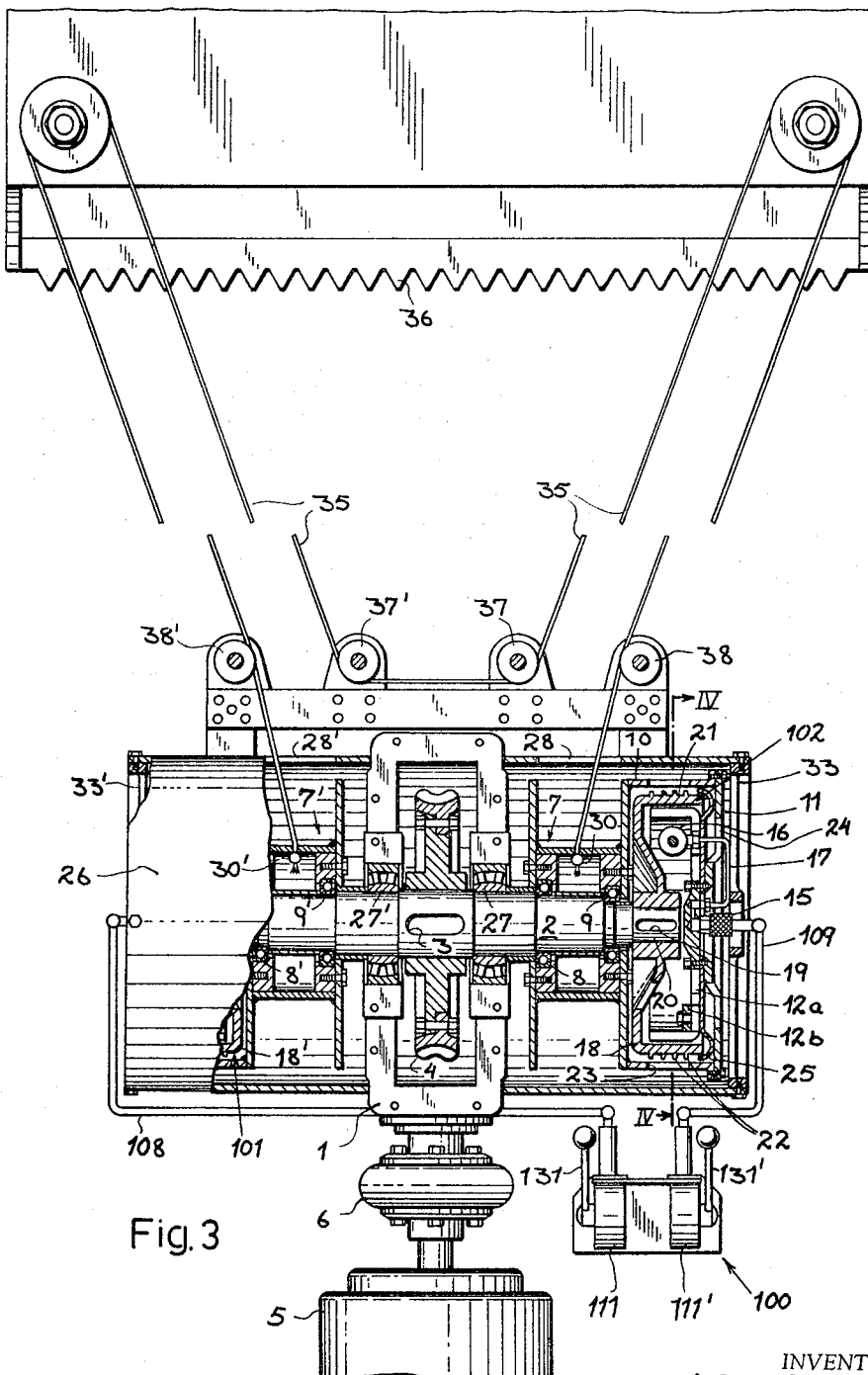
FIG. 3 is an axial sectional view of a drag-line winch, partly in elevation, according to the invention.

The cable 35 shown in FIG. 3 is assumed to lead to horizontally spaced points along the edge of a single drag bucket 36 adapted to be tilted or straightened out by the operator through concurrent or selective actuation of the control levers 131 and 131', the frame 1 being provided with idler rollers 37, 38 and 37', 38' to guide the several reaches of the cable. Naturally, the same dual-reel arrangement could also be used for individual control of two separate buckets hauled in from different direction by means of reels 7 and 7', respectively.

Figure 2:
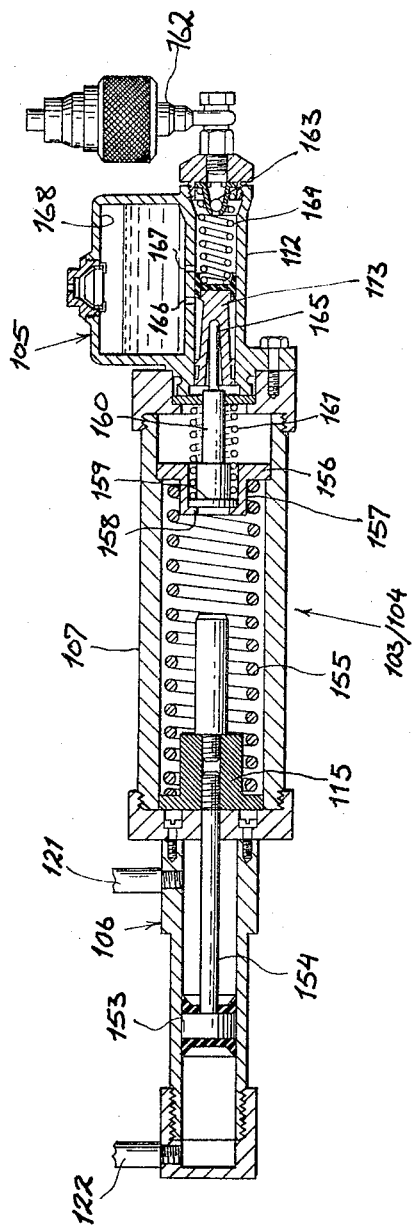
FIG. 2 is an axial cross-sectional view through the hydraulic control means of the system of FIG. 1.
Figure 4:
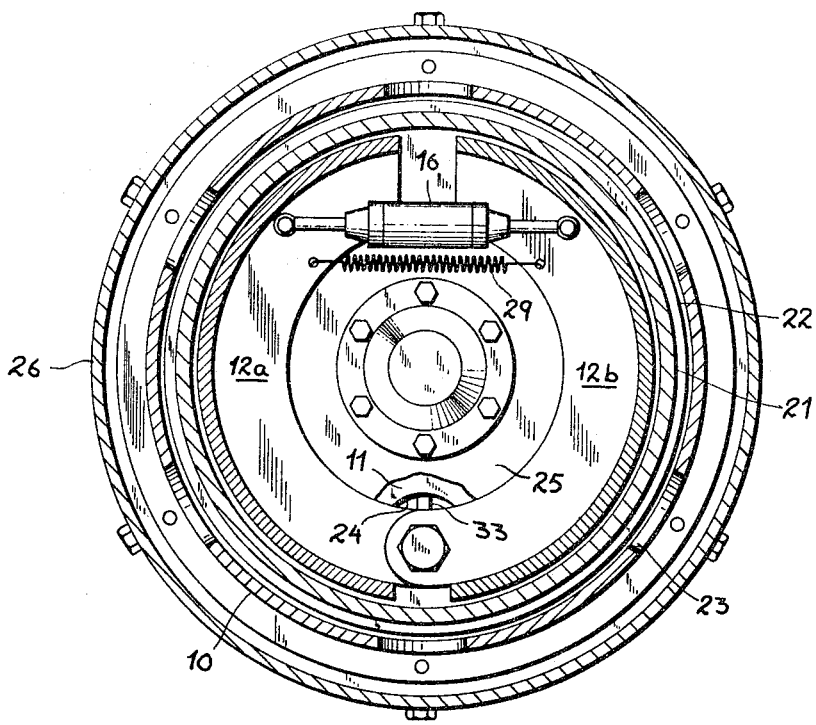
FIG. 4 is a cross-sectional view along the line IV—IV of FIG. 3.

Referring now to FIGS. 1 and 2, in which the automotive-type internal-expanding brakes used as the clutch mechanisms on the left and right-hand side of the winch of FIGS. 3 and 4 are designated at 101 and 102, it will be seen that the control system comprises a pair of hydraulic control units 103, 104, respectively connected to the hydraulic motors 101', 102' (piston-cylinder arrangements 16) of the clutch mechanism by lines 108, 109. These lines are coupled with the follower portions 5 of the units, these portions being constituted as master-cylinder arrangements of the type used for conventional automotive brakes. The hydraulic followers 5 are operated under the force applied by the resilient means 107 which, in turn, is stressed by the selectively positionable hydraulic transmitter generally designated 106. The double-acting piston-and-cylinder arrangement 106 is supplied with fluid via lines 120, 121 via electromagnetically operable valves 110a and 110b. Each of these valves is, in turn, provided with a pressure line 122, 123 connected with the respective pump 124, 125 of the fluid-pressure source 114 drawing the hydraulic fluid over a line 126 from a reservoir diagrammatically shown at 127. The output sides 122, 123 of each pump 124, 125 have respective branches 128, 129 with respective check valves 130, 130' for shunting hydraulic fluid to the reservoir 127 via a pressure-release valve 132 in the event there is a pressure build-up in one of the output lines 122, 123 beyond a predetermined level when, for example, the respective solenoid valves 110a, 110b connect the pump and reservoir with the respective transmitting cylinder 106. A pressure gauge 133 is connected with the lines 128, 129 to indicate the pressure at the outlet side of the pump. A return duct 134, common to the valves 110a and 110b and the pressure-release valve 132, communicates with the reservoir 127 via the usual filter 135.

As diagrammatically illustrated for the electromagnetically operable valve 110b, each of the control valves comprises a valve member 140 shiftable to the left and to the right from an intermediate position illustrated. In this intermediate positions, the lines 120, 121 from the respective transmitter 106, are blocked whereas the high-pressure lines 122 and 123 of the pumps 124, 125 are bypassed to the reservoir 127. In the extreme left-hand position of the valve member 140, hydraulic fluid is supplied under pressure from the respective lines 122, 123 if the respective conduit 121 is the right-hand side of the transmitter 106 to move the piston thereof (FIG. 2) to the left. Conversely, in the extreme right-hand position of the valve member 140 of the electromagnetically operable valve 110b, fluid is supplied under pressure from the line 123 to the left-hand side (line 120) of the transmitter 106 and the piston thereof is displaced to the right. In each of these latter positions, the other side of the transmitter 106 is connected with the reservoir 127 to complete the fluid circuit. So that the rate at which the transmitter system of the respective hydraulic control unit 103 or 104 is displaced is independent of the pressure at the outlet side of the respective pump 124, 125, each of the control systems is provided with a pressure-responsive throttle valve 141 whose plunger 142 is shiftable in dependence upon the output pressure of the pump via a branch 143. Thus, a valve member 144 connected to this plunger throttles fluid flow between line 120 and the conduit 145 connecting this line with the respective valve 110a or 110b. To displace the valve member 140 of the respective electromagnetically operable valve to the left or to the right, selectively, there are provided for each valve a pair of electromagnets or solenoids 146, 147. Each of these pairs of solenoids is connected with a respective reversing switch 111, 111' and is supplied with current via the direct-current source diagrammatically shown as a rectifier adapted to rectify the alternating current from a line transformer 151.

From FIG. 2, it will be seen that each of the hydraulic units 103, 104 comprises a transmitter portion 106 whose piston 153 is displaceable to the left or to the right, selectively, depending upon the hydraulic-pressure differential applied thereacross via the lines 121, 122. The piston 153 is coupled via a rod 154 with a seat 115 for a compression spring 155 in the force-transmitting resilient portion of the control unit. The spring 155 bears upon an axially shiftable plate 156 whose bushing 157 forms an annular abutment 158 for a ring 159 of a force-transmitting rod 160 held against this abutment by the spring 161. The rod 160 extends into the master cylinder or receiver 105 which, as previously indicated, is constituted in the manner of a master cylinder of an automotive hydraulic-brake system. The receiving portion 105 of the hydraulic control unit has a hydraulic cylinder 12 connected with the respective servomotor 101', 102' of the clutch mechanism via a fitting 162 and a conventional check valve 163. A spring 164 within this cylinder resists displacement of the piston 113 to the right, this piston being provided with a sheet 166 for the projecting portion of rod 160. The cylinder 112 communicates, via the ports 166, 167 adapted to be blocked by the piston 113 upon its displacement, with the brake-fluid reservoir 168.

*Operation*

In the intermediate position of the control system illustrated in FIG. 1, the electromagnets 146, 147 of the electromagnetically operable valves 110a, 110b are unenergized and the actuating levers 131, 131' of the switches 111, 111' are in their illustrated intermediate position.

Since the lines 120 and 121 are blocked, the piston 153 of the servo transmitter 106 of each control unit 103, 104 is locked in position. When, however, the switch 111 or 111' is actuated, the valve member 140 of the respective electromagnetically operable valve 110a, 110b is displaced to the left or to the right depending upon the switch position. Hydraulic fluid is then fed to the servo transmitter 106 of the respective control unit 103, 104 on one side of the piston 153 while fluid is drained from the transmitter on the other side of this piston so that the piston is displaced to the left or the right accordingly. It will be evident that the position of the piston 153 is dependent only upon the duration of operation of the switch since immediately upon return thereof to its position illustrated in FIG. 1, blocked condition of the serval transmitter is restored. The position of the piston 153, which bears upon the spring 155, determines the force applied by this spring to the piston 113 of the receiver 105 and thus the pressure applied by this piston to the respective hydraulic motor 101', 102', of the respective clutch piston 101, 102. The longer hydraulic fluid is supplied to the pressure side of the transmitting portion 106, the higher is the pressure applied to the respective hydraulic motor and thus the greater is the braking force. The torque-transfer ratio of the respective clutch mechanism is thus proportional to the pressure applied to the respective master cylinder 105. The switches 111, 111' can be conventional tilting or toggle switches with three positions corresponding to actuation of the brake, deactivation of the brake and "neutral."

The invention described and illustrated is believed to admit of many modifications within the ability of persons skilled in the art, all such modifications being considered within the spirit and scope of the appended claims.

We claim:
1. A control system for a winch assembly having a driven shaft, at least one cable reel journaled for rotation jointly with said shaft and relatively thereto, and an automotive-type brake mechanism for coupling said reel with said shaft and having a piston-and-cylinder arrangement forming a hydraulic motor for operating said mechanism, said system comprising:
    hydraulic control means remote from and communicating with said hydraulic motor for selectively actuating said motor to regulate the coupling of said shaft with said reel, said hydraulic control means including a hydraulic-fluid-operated force-transmitting portion, a force-receiving portion connected with said hydraulic motor for supplying hydraulic fluid thereto, and a resilient portion interconnecting said force-transmitting and force-receiving portions; and
    electromagnetically operable valve means connected with said control means for actuating said force-transmitting portion.

2. A control system as defined in claim 1 wherein said force-receiving portion is formed as an automotive-type master brake cylinder having a piston for displacing fluid to said hydraulic motor, said resilient means bearing upon said piston.

3. A control system as defined in claim 2 wherein said resilient means is a compression spring acting upon said piston to urge fluid from said master cylinder to said hydraulic motor.

4. A control system as defined in claim 1 wherein said force-transmitting portion includes a hydraulic cylinder, a double-acting piston displaceable in said cylinder and acting upon said resilient means, and conduit means for supplying fluid under pressure to said cylinder on opposite sides of said piston and for leading fluid therefrom.

5. A control system as defined in claim 4, further comprising a pump for displacing hydraulic fluid and a reservoir for said fluid forming a hydraulic-fluid circuit, said valve means being connected in said circuit and to said conduits, said valve means being provided with a valve member having a first extreme position wherein hydraulic fluid of said circuit is supplied to said cylinder in a sense biasing said piston to compress said resilient means, a second extreme position wherein hydraulic fluid of said circuit is supplied to said cylinder in a sense biasing said piston to relieve said resilient means, and an intermedate position wherein fluid flow to and from said cylinder is blocked, said valve means further having respective electromagnetic means selectively energizable for shifting said member into said extreme positions.

6. A control system as defined in claim 1 wherein said portions are all provided with a common housing.

7. A control system as defined in claim 1 wherein said winch assembly includes a further cable reel journaled for rotation jointly with said shaft and relatively thereto and a further automotive-type brake mechanism similar to the first-mentioned mechanism for coupling said further reel with said shaft, said system including additional hydraulic control means similar to the first-mentioned control means for regulating the coupling of said further reel with said shaft.

References Cited by the Examiner

UNITED STATES PATENTS 2,497,603  2/1950  Helstrom _____ 254—187
3,042,166  7/1962  Crane _____ 192—85
3,162,018  12/1964  Daley.

EVON C. BLUNK, *Primary Examiner.*

H. C. HORNSBY, *Assistant Examiner.*